United States Patent [19]
Slaughter et al.

[11] Patent Number: 5,442,552
[45] Date of Patent: Aug. 15, 1995

[54] ROBOTIC CULTIVATOR

[75] Inventors: David C. Slaughter; Robert G. Curley, both of Davis; Pictiaw Chen, El Macero; Durham K. Giles, Davis, all of Calif.

[73] Assignee: The Regents of the University of California, Oakland, Calif.

[21] Appl. No.: 32,075

[22] Filed: Mar. 16, 1993

[51] Int. Cl.⁶ ............................................. G06F 15/20
[52] U.S. Cl. ........................ 364/424.07; 364/424.02; 364/413.13
[58] Field of Search .................. 364/424.07, 413.13; 382/10, 11, 12, 13, 14, 15; 358/455

[56] References Cited

U.S. PATENT DOCUMENTS

| | | | |
|---|---|---|---|
| 4,742,556 | 5/1988 | Davis, Jr. et al. | 382/10 |
| 4,835,691 | 5/1989 | Rotem et al. | 364/424.07 |
| 4,868,752 | 9/1989 | Fujii et al. | 364/424.07 |
| 4,924,374 | 5/1990 | Middleton et al. | 364/424.07 |
| 5,088,561 | 2/1992 | Jurgena . | |
| 5,103,917 | 2/1992 | Moore . | |
| 5,165,064 | 11/1992 | Mattaboni | 364/424.07 |
| 5,274,714 | 12/1993 | Hutcheson et al. | 382/15 |
| 5,283,736 | 2/1994 | Nagatsuki et al. | 364/413.13 |
| 5,296,940 | 3/1994 | Kawashima | 358/455 |
| 5,297,222 | 3/1994 | Mori et al. | 382/14 |

OTHER PUBLICATIONS

Slide Guide Guidance System Brochure (1992), Sukup Manufacturing Company.
Row Crop Navigator Guidance System (1989) HR Manufacturing Co.
*Crow-Row Detecting System by Neural Network* by T. Kobayashi et al., Dept. of Agriculture Engineering, Hokkaido University, Japan, pp. 647–652, 1992.
Crop-Row Detector Equipped with One-Dimensional Image Sensor (Part 1), Shun–ichi Hata, Faculty of Agriculture, Hokkaida University, Japan (1992) (In Japanese) Abstract in English.
*Crop-Row Detector Equipped with One-Dimensional Image Sensor (Part 2),* Shun–ichi Hata, Faculty of Agriculture, Hokkaida University, Japan (1992) (In Japanese) Abstract in English.
*Crop-Row Detector Equipped with One-Dimensional Image Sensor (Part 3),* Shun–ichi Hata, Faculty of Agriculture, Hokkaida University, Japan (1992) (In Japanese) Abstract in English.
*Fourier and Hadamard Transforms for Detecting Weeds in Video Images,* Shropshire et al., presented at the 1989 International Winter Meeting sponsored by The American Society of Agricultural Engineers.
*Image Analysis for Vision–Based Agricultural Vehicle Guidance,* Brown et al., University of Saskatchewan, Canada, SPIE vol. 1379, Optics in Agriculture 1990 pp. 54–68.
*An Algorithm for Separating Guidance Information from Row Crop Images,* Reid et al., American Society of Agricultural Engineers, (1988) 0001–2351/88/31-06–1624, pp. 1624–1632.

Primary Examiner—Mark R. Powell
Assistant Examiner—Steven P. Sax
Attorney, Agent, or Firm—Fisher & Associates

[57] ABSTRACT

A robotic cultivator is provided for automatically positioning cultivation tools relative to a centerline of a plant row. The cultivator comprises a video camera for gathering visual information about plants in a plant row. A frame grabber is then utilized to generate a digitized image of the visual information. A computer then manipulates the visual information to determine a centerline of the plant row. Finally, a positioning device moves the cultivation tools based upon the current position of the tools with respect to the centerline.

16 Claims, 8 Drawing Sheets

FIG. 6 METHOD 1

FIG. 7 METHOD 2

ROBOTIC CULTIVATOR

BACKGROUND OF THE INVENTION

1. Field of the Invention

The present invention relates generally to devices which aid in plant cultivation, and more particularly to a robotic cultivation system which utilizes computer vision.

2. Description of the Prior Art

One of the major issues concerning agricultural production in the United States is the current reliance on chemical cultural practices to maximize crop yields and minimize cost. It has been estimated that in 1984 sixteen billion dollars were spent world wide on pesticides. Approximately 50% of that amount was directly related to herbicide products. The United States is the largest pesticide user in the world and applies more than three times the quantity of pesticides as the number two country (Japan). Herbicides account for approximately 85% of the pesticides used in the United States.

Unfortunately the continued reliance on chemically based production practices has a detrimental effect upon the environment and human health. This detrimental effect takes the form of contamination of water, soils and food produced therefrom. In addition, the effect of chemical residues are often cumulative and their continued use may be increasingly detrimental to the environment. This problem is often compounded because fewer new herbicides are being released due to the increasing costs of development, testing, and registration. The long-term use of herbicides also has the potential for adversely affecting the growth and production of alternate crops grown in a rotation system.

Additionally, with the increasing political pressure to reduce the amount of chemicals used, farmers need an alternative to chemical weed control in order to remain competitive in the world market for agricultural products.

There is a need to develop alternate means of weed control in a reduced pesticide environment. Mechanical cultivation and hand hoeing, have been the primary alternatives to chemical treatment. However, hand labor costs continue to increase making hand hoeing prohibitively expensive in many cases. Thus, the only other viable solution is a mechanical system. Existing systems use either fixed (non-movable) tools or tools which are positioned based upon an indirect measurement of the crop's location. For example, this indirect measurement may be achieved from information such as bed edge or furrow bottom. This indirect method requires mechanical contact with the object being measured and therefore may physically alter the object being sensed. Such mechanical contact creates mechanical wear, and is slow to respond to changes in the sensed object. These mechanical systems have the further disadvantages of being costly, relatively slow, e.g. operating at 2-3 MPH, and restricted to daytime operations. Therefore a viable system which is fast, efficient and inexpensive is required.

SUMMARY OF THE INVENTION

It is therefore an object of the present invention to provide a robotic cultivator which will provide an improved means for weed control.

It is a further object to provide a robotic cultivator which will reduce the amount of herbicide necessary to effectively protect crops.

It is yet another object to provide an efficient cultivator which may be operated during the day or night and at speeds approaching 10 miles per hour.

It is yet another object to provide a cultivator which may be positioned to within ±0.25 inches of the centerline of a row of plants.

Finally, it is an object of the invention to provide a cultivator which will not only provide in row cultivation (including crop thinning) but also between row cultivation.

According to one broad aspect of the present invention, there is provided a robotic cultivator for automatically positioning cultivation tools relative to a centerline of a plant row. The cultivator comprises a visual input means for gathering visual information about plants and weeds in a plant row; a digitizing means for generating a digitized image of the visual information; distinguishing means for distinguishing between plants and weeds in the digitized image a means for determining a centerline of only the plants based upon the digitized image of the visual information; and a means responsive to the means for determining a centerline for locating tools relative to the centerline.

According to another broad aspect of the invention, a method of controlling the robotic cultivator is provided. The method comprises the steps of generating a visual image of plants and weeds in the plant row; digitizing the visual image based upon visual characteristics of the plants and weeds in the plant row; generating means and covariance values based upon he visual characteristics; generating a probability table from the mean and covariance values; comparing the digitized image, one pixel at a time, with the probability table to determine which pixels represent plants; generating a representative image which represents possible plant locations; and determining a centerline based upon the possible plant locations.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
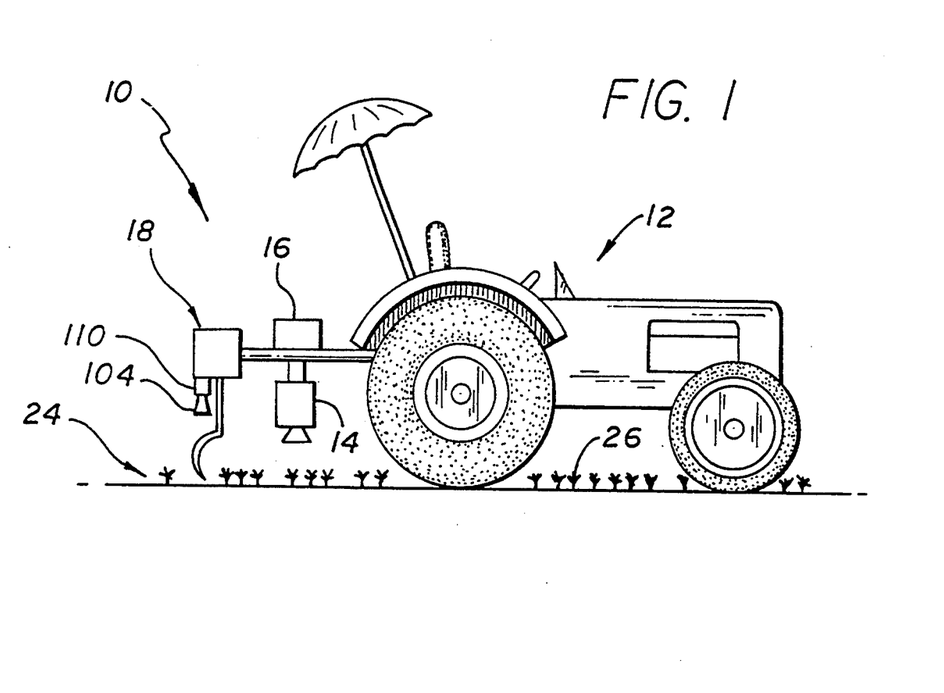
FIG. 1 is a schematic side elevational view of the in row robotic cultivator constructed in accordance with a preferred embodiment of the invention.
Figure 2:
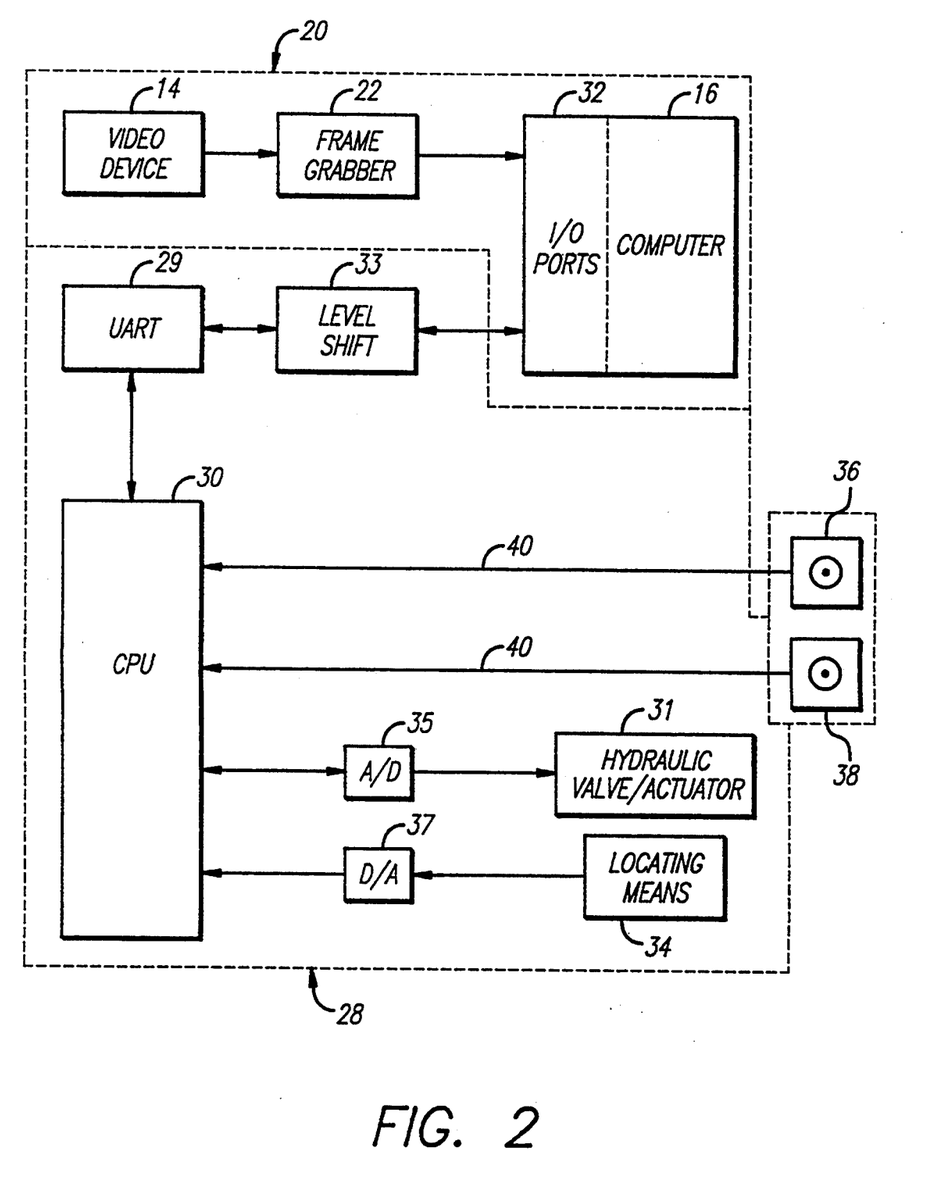
FIG. 2 is a block diagram of the computer vision and control system for the robotic cultivator of FIGS. 1 and 8.

With reference to the figures, wherein like reference characters indicate like elements throughout the several views and, in particular, with reference to FIG. 1, a robotic cultivator, generally denoted 10, is illustrated. As may be seen, a tractor or similar farm equipment 12 is equipped with a video device 14, a computer 16, and weeding equipment or cultivation tools 18. The general concept of the invention is the utilization of visual data from the video device 14 to control the positioning of weeding equipment 18 so that an operator of the tractor 12 will only be concerned with the steering of the tractor 12. To accomplish this, a specialized computer vision system 20 has been developed and its major components are illustrated in FIG. 2. The computer vision system includes the video device 14, a digitizing means such as a frame grabber 22, and computer 16 for manipulating the data from video device 14 and controlling the weeding equipment 18 based upon this data. Each of these components will be discussed in detail below.

The computer vision system 20 uses spectral characteristics that are unique to the crop due to the chemical composition of the plant tissue or physical characteristics of the crop plant which cause a unique optical response. For example, crop plant tissue contains chlorophyll, a chemical that absorbs light at the wavelengths of 680 nm (red) and 420 nm (blue). The chlorophyll absorption pattern causes plants to appear green to the human eye which is sensitive to light between 400 nm and 700 nm. An example of a physical characteristic is the waxy leaf surface common to some types of plants. The waxy surface will appear shiny due to high levels of specular reflections. The computer vision system 20 uses visual characteristics that distinguish the crop from all other objects such as weeds and row boundaries. It should be appreciated that most chemicals have unique absorption patterns in the near and middle infrared regions as well as the electro-magnetic spectrum. Thus, by utilizing video device 14, an image of the spectral characteristics may be taken. By appropriately selecting the proper video device 14, select regions of the spectral characteristics may be examined. In a preferred embodiment, a conventional camera which functions within the visual spectrum is utilized. It should be appreciated that by using a camera, such as monochromatic and multiwavelength cameras, which operates in the infrared or electromagnetic spectrum, these spectrums may be utilized for study.

Once a type of video device or camera 14 is selected, the visual information is converted to a computer understandable format. In a preferred embodiment, the camera 14 is a Sony model XC-711 solid state camera with NTSC, S-Video, and RGB video outputs. This camera 14 has an automatic white balance and electronic shutter features which are not essential but which improve the performance of system 20. The visual information is input to computer 16 using a real-time color video digitizer or frame grabber 22. In a preferred embodiment, the frame grabber 22 is one which is produced by RasterOps model 24XLTV with NTSC, S-Video and RGB video inputs and is capable of digitizing a complete visual scene in one thirtieth of a second. The video format used, i.e. NTSC, S-Video, RGB, etc. and the speed of digitization are not critical to the operation of system 20. It should be appreciated that the higher the video quality of the format and the higher the speed of digitization, the better the performance of system 20. The computer 16 used is an Apple Mackintosh model IIfx. It should be appreciated that any computer 16 may be utilized so long as the performance of system 20 is not jeopardized by the speed of computer 16.

The camera 14 is mounted directly above one pair of cultivation tools 18 in such a way that the centerline 24 of camera 14 is directly above the center row of the two tools 18 below. For clarity, only one tool 18 is illustrated in FIG. 1. The camera 14 and the pair of tools 18 move as a unit. This unique configuration allows computer 16 to know if camera 14 is centered above a crop row 26, the tools 18 are also centered and thus eliminates any additional computation for location of the tools 18 relative to camera 14. It should be appreciated that camera 14 may be located anywhere with respect to tools 18 but that an adjustment to a position error, discussed below, will have to be made.

The camera 14 is mounted at a right angle to its "traditional" mounting to allow a long axis of the aspect ratio of camera 14 to be aligned with crop row 26. This method of mounting, although not critical, provides maximum spatial resolution for a typical off-the-shelf video camera 14.

The tilt of camera 14 is adjustable to allow for variations in planting configuration, variations in germination rates, or other factors that could affect the number of crop plants per row. It should be appreciated that a conventional pivotal elbow may be utilized for mounting camera 14 to tractor 12. A typical configuration would allow camera 14 to view between six and eight feet of row 26 at one time.

When computer 16 examines the image generated by camera 14 to determine the location of row 26, it is restricted to a trapezoidal region of interest (ROI) which coincides to the perspective view of the six to eight foot region in which the crop row 26 is planted. For small plants, one to two true leaf stage, the region of interest is from four to six inches wide. By restricting computer 16 to this region of interest, system 20 is capable of operating in planting systems with multiple rows 26 of crops planted on a single bed and not being confused about which row 26 system 20 is following. The restricted region of interest also reduces the time required to locate the crop row 26 since the entire image need not be examined.

Once the location of the crop row 26 is known, the deviation between the current position and the desired position of tools 18 is calculated. This deviation is called the position error and is used as the input or feedback to a closed loop control system 28, discussed below, which controls the position of tools 18.

The closed loop control system 28 includes the data from computer 16 of the computer vision system 20, a universal asynchronous receiver and transmitter (UART) 29, a central processing unit CPU 30, an electronically controlled hydraulic valve and actuator 31, and a locating means 34. Analog to digital 35 and digital to analog 37 converters are provided to facilitate communication between actuator 31 and locating means 34, respectively.

Data from computer 16 is transmitted via a input/output port 32 to a level shifter 33. In a preferred embodiment, the I/O port 32 is a RS-232 serial interface. Level shifter 33 is provided to convert the ±15 volt output signal of I/O port 32 to a signal compatible with the UART 29, i.e., a voltage signal between 0 and 5 volts. Level shifter 33 is conventional in nature and may be purchased from Maxin Corp. (Model Max 232CPE). UART 29 is electrically connected to a second CPU 30 which is a conventional microcontroller, type 8748, produced by Intel Corp. This microcontroller is utilized to control a hydraulic valve and actuator 31 and receive input from locating means 34. The hydraulic valve and actuator 31 have been selected because hydraulic power is readily available on most tractors 12. It should be appreciated that the valve and actuator 31 combination may be pneumatic, electric or mechanical. The preferred embodiment utilizes proportional velocity control to control the position of the cultivator tools 18. More sophisticated techniques such as derivative or integral control systems may be utilized in place of the proportional control system.

In the current control system 28, the flowrate of the hydraulic fluid is directly proportional to the position error determined by the computer 16 or CPU 30. The flowrate of hydraulic fluid is in turn proportional to the velocity of cultivation tools 18 in the direction perpendicular to the direction of travel, i.e., perpendicular to row 26. As the error increases, tools 18 are moved more quickly, and as the error decreases, the velocity and speed of tools 18 also decrease. When the error approaches zero, tools 18 are not moved.

Two electronically controlled hydraulic valves 31 have been utilized in the control system 28. The best performance was exhibited by a valve 31 manufactured by Double A (Model VPQF-5M-Cl-CY-5-10A1-DC12). In the alternative, a valve 31 manufactured by Olsen Controls (Model DSNV-C02-015-S1) may also be used.

A locating means 34 such as a linear potentiometer is utilized to determine the exact position of tools 18 at any time. In a preferred embodiment, the locating means 34 is a linear potentiometer manufactured by Waters (Model LFW-12/300-0D5). When there are no plants present in the field of view; if the field of view is completely obscured by plant material; or if the operator desires to position the cultivator manually, the linear potentiometer 34 is used by the computer in a closed control loop to maintain the desired position. Manual adjustment is facilitated by two joysticks 36 and 38, one for course and the other for fine position adjustments respectively. The joysticks 36 and 38 also allow the operator to adjust the tool position for errors due to wind or leaning plants. Joysticks 36 and 38 are attached to CPU 30 via conventional communication lines 40.

Figure 9:
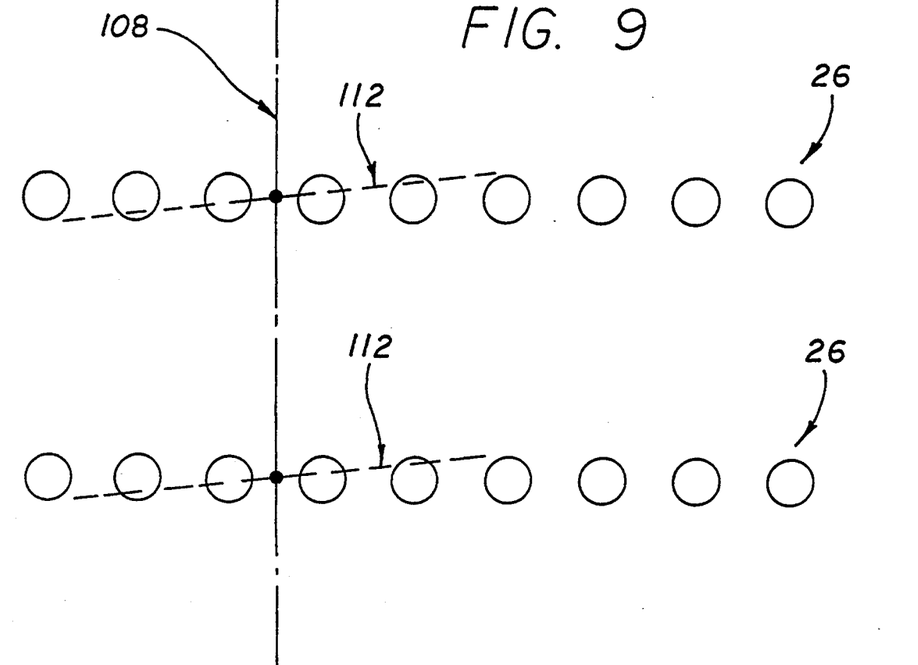
FIG. 9 is a plan view of the spray pattern of the prior art and that of the robotic cultivator of FIG. 1.
Figures 10, 11:
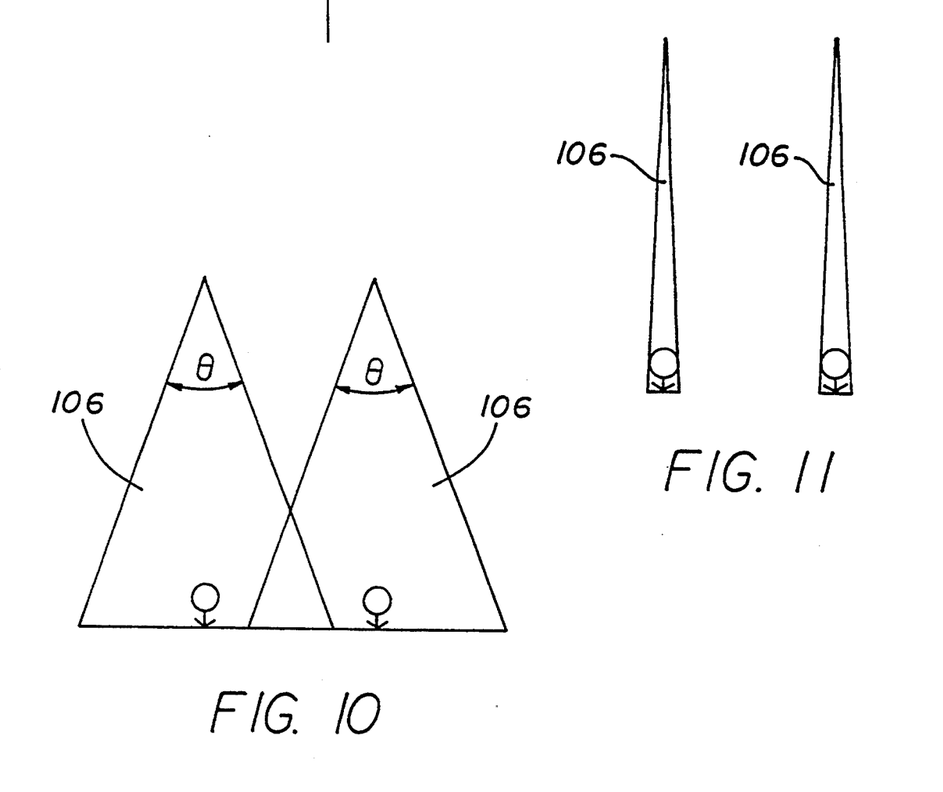
FIG. 10 is a front elevational view of the spray pattern of the prior art.
FIG. 11 is a front elevational view of the spray pattern of the robotic cultivator of FIG. 1.

Turning now to FIGS. 9, 10 and 11, the spray pattern of a rotating band spray nozzle 104 is illustrated. This spray nozzle 104 is mounted on tool 18 and may be used in combination with conventional weeding tools 18.

A band sprayer 104 is one where only a narrow band of material is sprayed on an object. The goal is to spray material only on the crop and not on the soil. In conjunction with the computer vision system 20, the size and location of the crop will be determined and the spray will be adjusted accordingly. The method for determining the size and location of the crop is described in detail in conjunction with the operation of the device, below. Once the crop width is known, computer 16 will adjust the width of the spray to match the width of the crop. The spray width will be adjusted by rotating each spray nozzle 104 about its vertical axis. Spray nozzles typically emit a triangular shaped spray pattern 106 as illustrated in FIG. 10. Off the shelf nozzles are usually categorized by the angle $\Theta$ of this triangle. For example, 40 degree and 80 degree nozzles are commonly available. When the spray from a typical nozzle hits the ground, the spray material will be deposited in a "fat" line 108 as illustrated in FIG. 9. By overlapping a series of spray nozzles this line of spray may be extended over several crop rows 26. In a traditional spray system, nozzles 104 are rigidly mounted to a boom and their orientation is fixed. In the preferred embodiment, each nozzle is mounted in a swivel coupling 110 which will allow nozzle 104 to rotate about a vertical axis. Normally nozzles 104 are aligned in a line perpendicular to the direction of travel, i.e., perpendicular to the crop row 26. In the preferred embodiment, nozzles 104 are rotated so that only the crop is sprayed and no soil is sprayed as illustrated in FIG. 11. Thus the "fat" line is rotated and is illustrated in FIG. 9 as lines 112. This results in an efficient spray system, particularly when the plants are small and there are large areas of soil exposed. Theoretically, if the crop was smaller than the width of the "fat" lines emitted by spray nozzles 104 the computer would rotate nozzles 104 so that they are parallel to the crop rows and also the direction of travel. In addition to the improved efficiency in spray application, this system also has a speed advantage over the conventional method. At any time in the conventional system, the amount of crop being sprayed in the direction of travel is equal to the width of the "fat" line 108. In the preferred embodiment, the amount of crop being sprayed in the direction of travel is approximately equal to the length of the "fat" line 112, particularly when the crop has a small width. This allows more crop plants to be sprayed at one time and allows the travel speed of tractor 12 to increase accordingly. It should be appreciated that weeds may be killed by mechanical cutting, laser cutting, water knife cutting, electrocution, spot spraying of herbicide, or burning. Any of these methods may be utilized by changing to the appropriate tools 18 in system 10.

Figure 8:
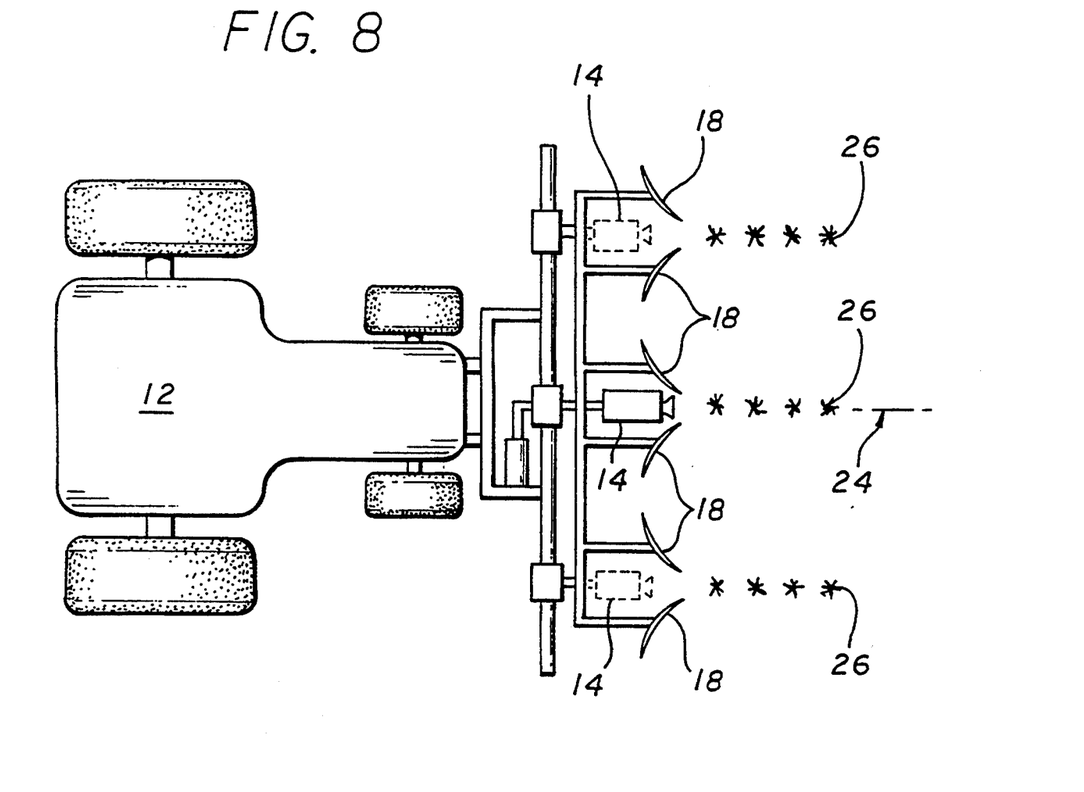
FIG. 8 is a schematic top plan view of an alternate embodiment of the between row robotic cultivator of FIG. 1.

Row crops are often planted several rows at a time. For example FIG. 8 illustrates tomatoes which are plated three rows at a time. The robotic cultivator 10 may be designed to have one or more pairs of cultivation tools 18 equipped with cameras 14. When the robotic cultivator 10 has one camera 14, then all of the pairs of cultivation tools 18 are controlled based upon the view of a single camera 14. When multiple cameras 14 are present, then the position of tools 18 are based upon the joint view of all cameras 14 involved. Multiple cameras 14 decrease the chance of guidance errors because the computer 16 ignores any camera view which is substantially different from the rest. If two cameras 14 are used, then the computer 16 can either ignore both if they do not agree or choose the most conservative of the two. If three cameras 14 are used, then the computer 16 may select the views from the two cameras 14 which agree.

Figure 12:
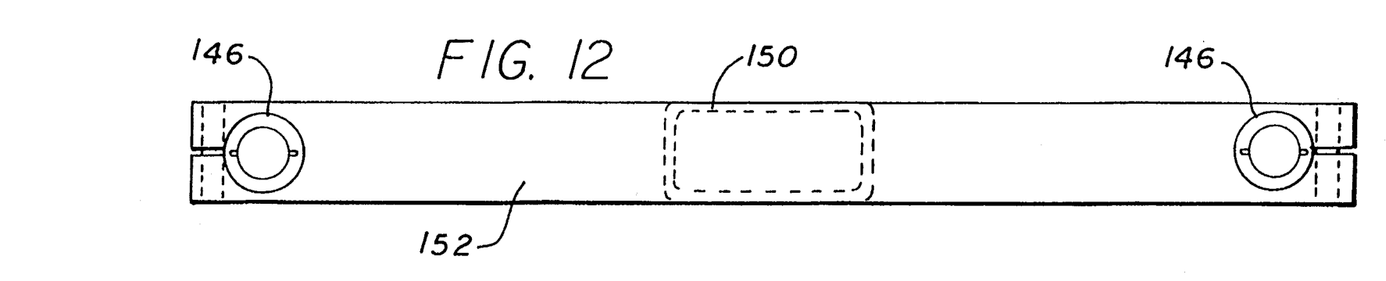
FIG. 12 is a top plan view of a "H" shaped frame which constitutes a component of the mechanical linkage of the robotic tool positioning mechanism.
Figure 13:
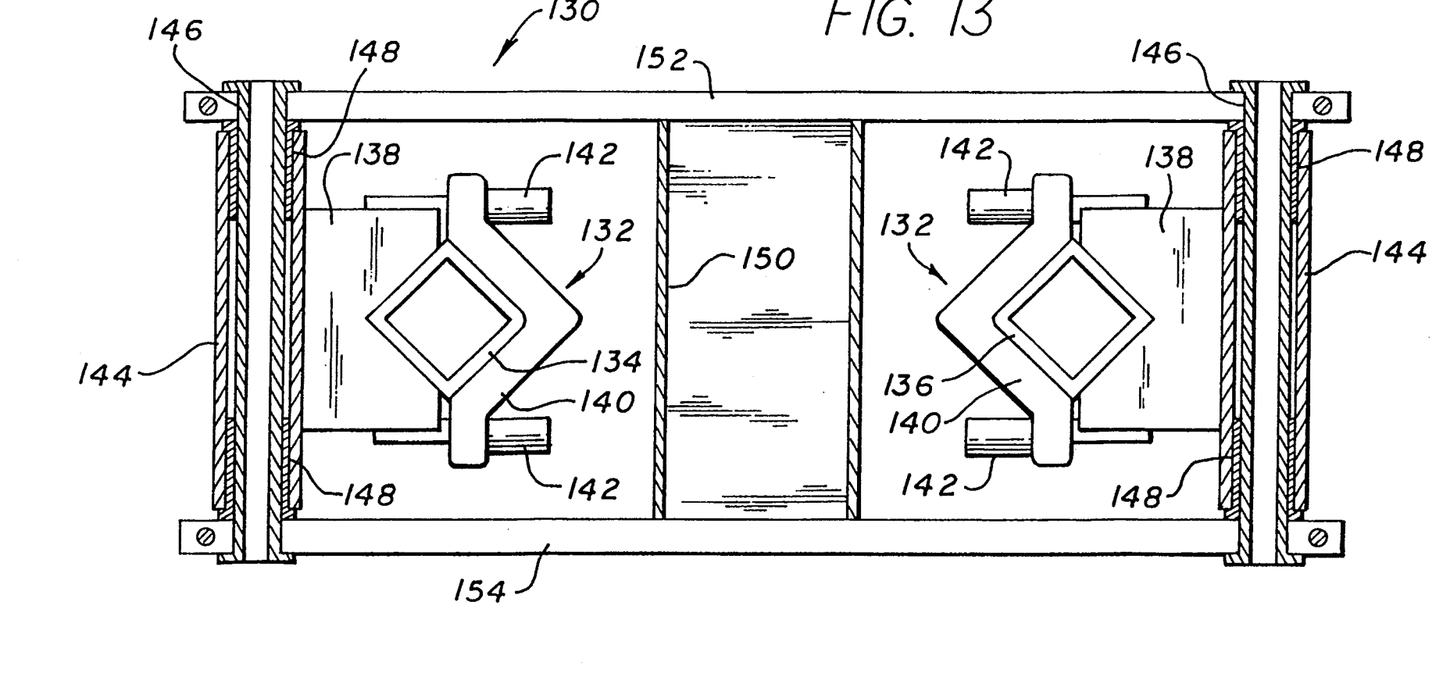
FIG. 13 is a cross-sectional view of the mechanical linkage of the robotic tool positioning mechanism.

The robotic system using a mechanical linkage for precise and accurate positioning of the tools common to row crop production but particular to the subject invention is illustrated in FIGS. 12 and 13. The mechanical linkage 130 as shown in FIG. 13 is capable of moving tools perpendicular to the direction of travel of the farm equipment 12 while remaining parallel to the ground.

The system is a pivoting parallelogram linkage utilizing a unique pivoting toolbar clamp 132. A first toolbar 134 is rigidly connected to the tractor 12, via a conventional three point hitch. A second toolbar 136 is free to move relative to the first toolbar 134 through the pivoting parallelogram linkage.

Each of the toolbar clamps 132 includes a first member 138 and a second member 140. Members 138 and a second member 140. Members 138 and 140 are held in tight gripping engagement with the tool bar 134 or 136 respectively by interlocking fasteners 142 which may be conventional threaded fasteners.

Tubular bearing members 144 are integral with the first clamp members 138 and concentricly surround corresponding cylindrical bearing members 146.

Bearing members 148 are interposed between members 144 and 146 so as to provide smooth rotational freedom between the members. Cylindrical bearing members 146 are secured within a "H" frame support which includes a tubular central support member 150 having an upper bar member 152 and a lower bar member 154 fixedly secured thereto.

Through the mechanical linkage 130, it can thus be understood that the free second toolbar 136 is capable of movement relative to the fixed first toolbar 134 to create the pivoting parallelogram linkage wherein the movable toolbar 136 is always parallel to the fixed toolbar 134. Therefore, as the movable toolbar 136 moves perpendicular to the direction of travel it also moves a small amount in the direction of travel.

Figure 3:
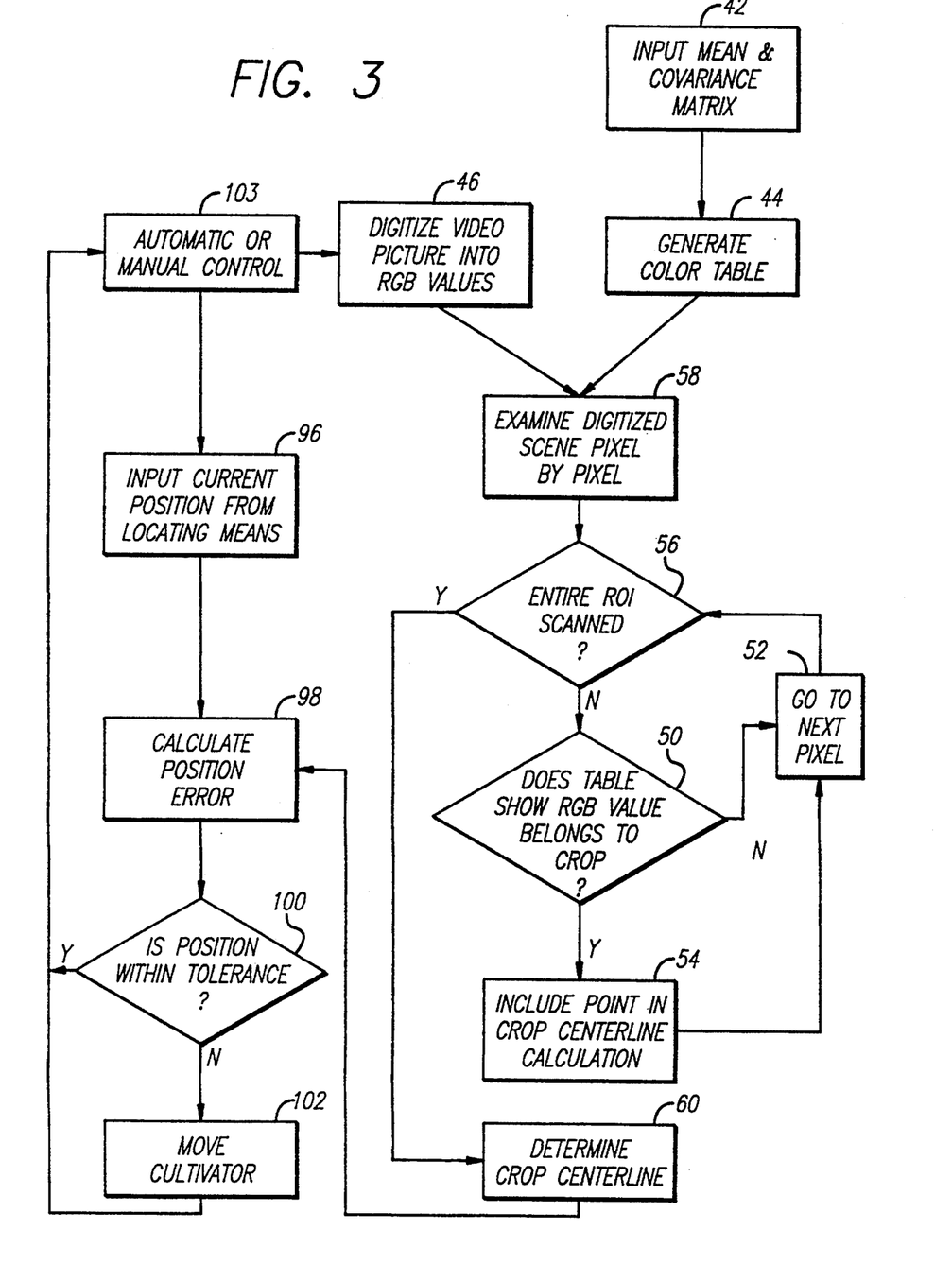
FIG. 3 is a flowchart of the control sequence for the robotic cultivator of FIG. 1.
Figure 4:
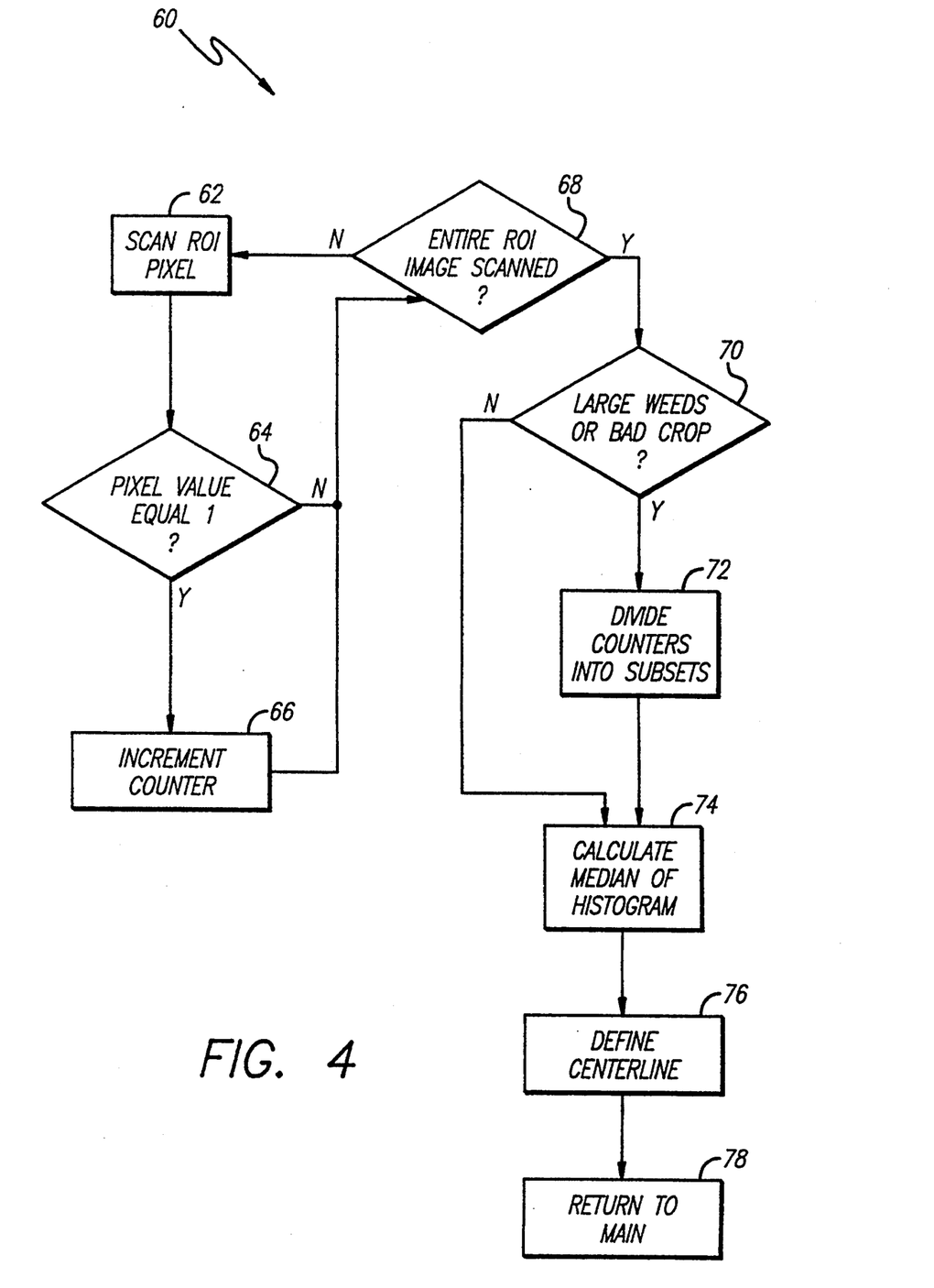
FIG. 4 is a flowchart of a preferred method of identifying a plant centerline which is utilized by the robotic cultivator of FIG. 1.
Figure 5:
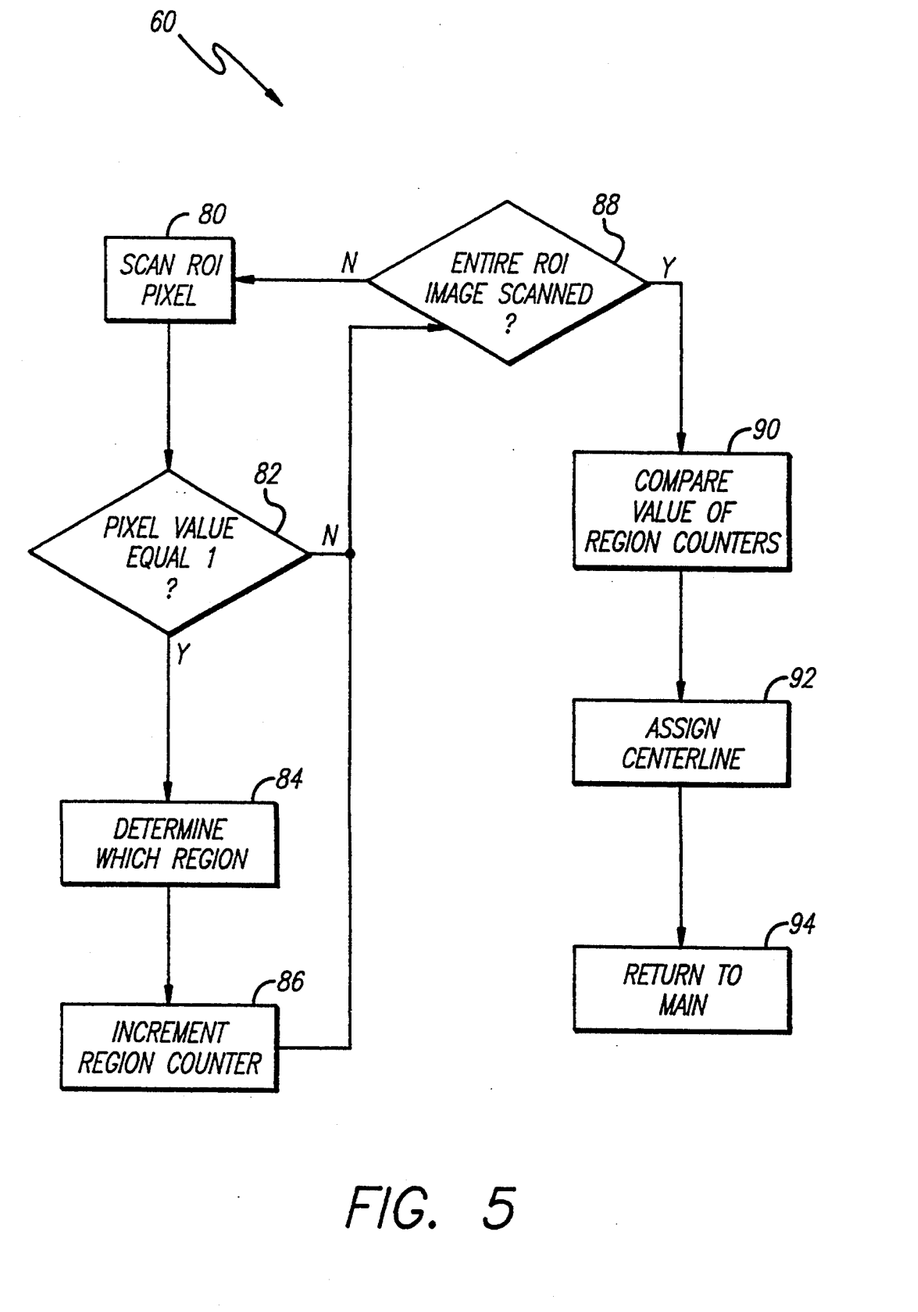
FIG. 5 is a flowchart of an alternate method of identifying a plant centerline which is utilized by the robotic cultivator of FIG. 1.

Turning now to the operation of the robotic cultivator 10, FIGS. 3, 4 and 5 illustrate the method for carrying out crop and row 26 identification. The method used to identify the crop location is based upon the following procedure.

All optical characteristics unique to the crop were identified by computer 16. The variability of these characteristics as tabulated by the computer by examination of several visual scenes. For example, the preferred embodiment used the red, green and blue characteristics of the crop for its identification. It should be appreciated that any characteristic may be utilized as discussed above. The red, green and blue characteristics were characterized by the following mean and covariance matrices on a 8 bit scale where the minimum intensity=0 and the maximum intensity=255

|  | Mean | Covariance | | |
|---|---|---|---|---|
|  |  | Red | Green | Blue |
| Red | 140.6 | 1463.4 | 826.8 | 353.2 |
| Green | 181.3 | 826.8 | 1572.3 | 1217.7 |
| Blue | 163.8 | 353.2 | 1217.7 | 1674.4 | a similar table of color characteristics may be used to identify non-crop objects. For example, the table below illustrates the mean and covariance for these non-crops.

|  | Mean | Covariance | | |
|---|---|---|---|---|
|  |  | Red | Green | Blue |
| Red | 56.0 | 88.1 | 50.7 | 62.1 |
| Green | 57.6 | 50.7 | 65.9 | 57.5 |
| Blue | 51.8 | 62.1 | 57.5 | 85.0 |

The actual numbers listed in the tables above are to illustrate the general concept and it should be appreciated that each type of crop may have a different optimum value which will allow the computer vision system 20 to uniquely distinguish the crop from surrounding weeds. This step of selecting and entering the means and covariance matrix is represented by input block 42.

Based upon the mean and covariance information, the computer then generates a color table as indicated by block 44. This color table is generated by applying Bayes Law, i.e. that the probability of a particular color will be exhibited by a crop plant may be expressed by the following equation:

$$D_i(x) = -\tfrac{1}{2}[(x-\mu_i)^t C_i^{-1}(x-\mu_i) + \log(|C_i|)] + \log(P(w_i))$$

where, $\mu_i$ is the mean color vector, $C_i$ is the covariance matrix, $w_i$ is the group of objects or classes, $P(w_i)$ is the a priori probability of class $w_i$, and x is the particular color of interest.

The probabilities were converted into logical values where zero indicates that the color is not likely to be part of a crop plant and a value of one indicates that the color is considered likely to be part of a crop plant. The table is used by the computer to rapidly determine which picture elements or pixels are most likely to be associated with crop plants.

The framegrabber 22 digitizes the red, green and blue levels into discrete values ranging from 0 to 255 in a eight bit word as indicated by block 48. This level of color resolution is not critical, however the higher the resolution, the better the performance.

The computer examines pixels in regions of interest and compares the color of each pixel to the corresponding logical value in the color table described previously. If the logical value is one then the computer considers the pixel to be a possible crop point, otherwise the pixel is ignored. This process is indicated by decision diamond 50 and blocks 52 and 54. This process is repeated until the last pixel in the frame is reached as indicated by decision diamond 56. After all of the pixels have been compared to the color table, a ROI representation of the picture is created, i.e. each pixel will have a value of either zero or one, depending on if that pixel represents a plant location or not. The computer vision system may be set to skip some pixels to increase the speed of the algorithm.

In many cases the color of the crop and the other plant material is indistinguishable. The computer then uses a stochastic pattern recognition technique to estimate where the centerline of the crop plant is located. This process is represented by block 60 in FIG. 3. The stochastic techniques try to identify a consistent linear region of plants among a chaotic, i.e. randomly positioned, group of weeds. Two stochastic pattern recognition techniques have been successfully implemented and demonstrated in actual field conditions at travel speeds between three and five times the normal cultivation speeds of traditional systems. The first is based upon the median value and is illustrated in FIG. 4. The second is based upon the most common linear region and is illustrated in FIG. 5.

The median value method is a statistical technique for estimating the central tendency of a population and is less biased by outliers than the mean or linear regression methods. The robotic cultivator uses the median in a unique way to estimate the location of the crop row. The computer scans the ROI of block 58 in a systematic manner starting at the upper left corner which corresponds to the view directly in front of the camera and to the left side. This is indicated by block 62. The computer scans across the image perpendicular to the direction of travel, i.e. perpendicular to the crop row. Whenever a pixel is identified as a possible crop plant, the computer increments a counter corresponding to the position along the line perpendicular to the crop row. This process is indicated by decision diamond 64 and block 66. There is one counter for each possible pixel position along this line. For the RasterOps framegrabber 22, each line is digitized into 480 pixels and so there are 480 corresponding counters. The process is then repeated as fixed increments in front of the camera, always scanning from left to right, until the opposite side of the image is reached. Once the entire image is scanned by the computer and is indicated by decision diamond 68, the values in the counters represent a cumulative cross-section or histogram of the row. Since the image was scanned in a systematic manner, the median of this histogram can be directly calculated by adding up the values in each position counter until a value equal to 50% of the population is reached. The position corresponding to the counter that causes the total sum to equal 50% of the population is the median row position. This process of calculating the median of the histogram is illustrated by block 74. If the field contains weeds that are substantially larger than the crop or the crop stand is not uniform, e.g., some of the crop is dead, the ROI is subdivided into several smaller regions and a median value is calculated for each. This process is represented by decision diamond 70 and block 72. The subregion median values are then compared and any portion of the image that is substantially different from the remainder is ignored. This helps the cultivator ignore very large weeds. The median of the histogram is then defined as the centerline 24 of the plant row as indicated by block 76. After the centerline 24 is established by this method, control of the process is returned to that as illustrated in FIG. 3 and as may be seen by block 78.

The second stochastic pattern recognition technique is based upon the most common of a set of linear regions and is illustrated in FIG. 5. As described previously, the mounting position of camera 14 provides a perspective view of the row 26 directly in front of the cultivation tools 18. The crop bed corresponds to a trapezoidal region or ROI where the base of the trapezoid is near the cultivation tools 18 and the tip of the trapezoid contains the crop plant farthest from the cultivation tools. In this configuration, the tip of the trapezoid acts like a vanishing point in a perspective view. As camera 14 is shifted perpendicularly to row 26, a unique family of linear regions are defined in the image by the row of crop plants. This family sweeps across the trapezoidal ROI and all vanish at the same vanishing point represented by the tip of the trapezoid. This may be visualized as the pattern sweep of a pendulum of a grandfather clock or the opening of a hand held oriental fan. In the preferred embodiment, the family of linear regions is subdivided into twenty-five distinct linear regions. This may be visualized as "thick" lines, each one representing a possible position of the crop relative to camera 14. The computer 16 then scans the ROI, indicated by block 80 and counts the number of crop plant pixels in each of the twenty-five regions. This process is illustrated by decision diamond 82 as well as blocks 84 and 86. This process is repeated until the entire ROI is scanned and is indicated by decision diamond 88. The values of each region are then compared to determine which region has the highest value and this process is indicated by block 90. The region with the greatest number of plants in it is considered to represent the centerline 24 position of the crop and is represented by block 92. After the centerline 24 is established by this method, control of the process is returned to that as illustrated in FIG. 3 and as may be seen by block 94.

Turning back to the overall method of control as illustrated in FIG. 3, the position of the cultivator tools 18 are determined by one of the processes shown in FIGS. 4 and 5 and is represented by block 60 in FIG. 3. Next, a position error is determined, as illustrated in block 98, by comparing the actual position of tools 18 to centerline 24. If this error is within a preestablished tolerance limit, then the next video frame is digitized by framegrabber 22 and the above method is repeated with respect to this new frame. If the error exceeds the tolerance limit, then the cultivator tools are moved and the process is repeated. This process is represented by decision diamond 100 and blocks 98 and 102. It should be apparent that either the entire cultivation tool 18 may be moved as described above or the system may be set up to control only the closest cultivation tools 18 to the crop. It should also be appreciated that the positioning of tool 18 may be carried out automatically or may be performed manually by using joysticks 36 as inputs to the control system.

Turning now to the determination of the crop width, either of the above described stochastic pattern recognition techniques may be utilized. Preferably, the first method will be used. In that case, the crop width may be defined by variance range from the histogram.

Figure 6:
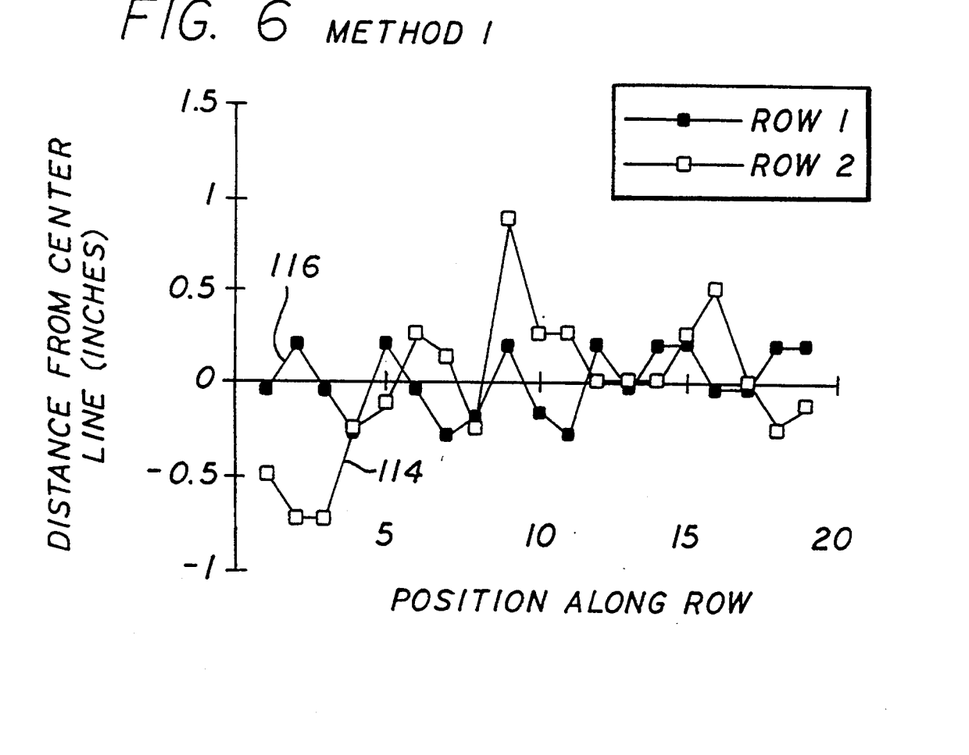
FIG. 6 is a graph of the displacement from the centerline v. position along a row for the method illustrated in FIG. 4.
Figure 7:
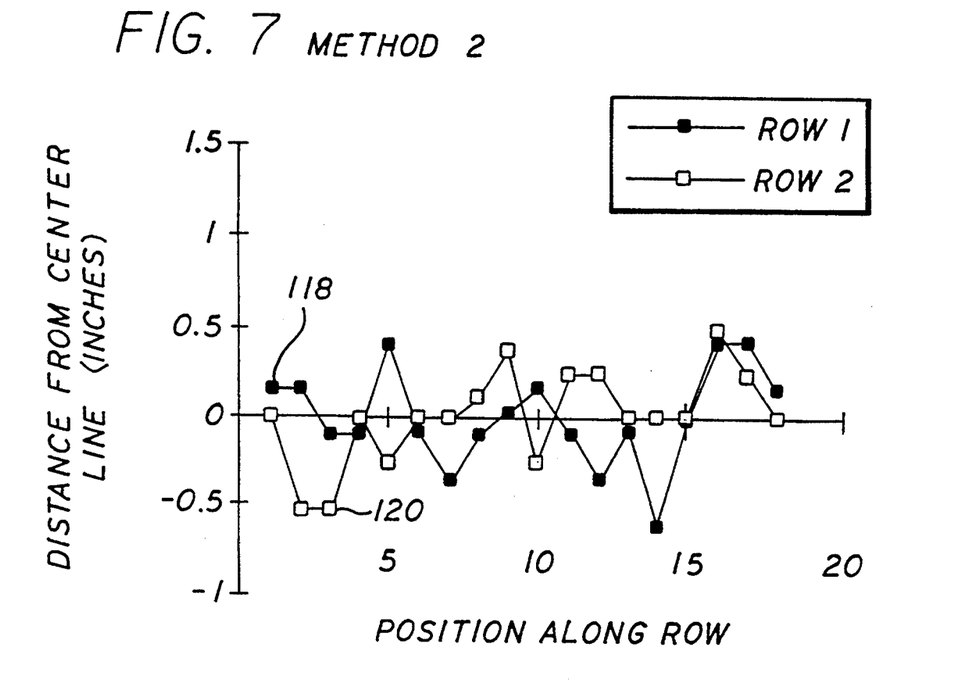
FIG. 7 a graph of the displacement from the centerline v. position along a row for the method illustrated in FIG. 5.

Turning now to FIGS. 6 and 7, actual results of field tests for the above two methods are displayed. Each of these figures illustrates the distance from the centerline of tool 18 with respect to position along the row. Two trials were run in June 1991 for each method. The graph of FIG. 6 corresponds to the median value method and FIG. 7 corresponds to the most common linear region method. As may be seen by curves 114 and 116, corresponding to the first method trials one and two, respectively, have a standard error of less than +/−0.4 inches 68% of the time. While curves 118 and 120, corresponding to the second method trials one and two, respectively, have a standard error of less than +/−0.3 inches 68% of the time.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A robotic cultivator for automatically positioning cultivation tools relative to a centerline of a plant row, said cultivator comprising:

visual input means for gathering visual information about plants and weeds in said plant row;

digitizing means for generating a digitized image of said visual information;

distinguishing means for distinguishing between said plants and said weeds in said digitized image;

means for determining a centerline of only said plants based upon said digitized image of said visual information; and means responsive to said means for determining a centerline for locating said tools relative to said centerline.

2. The cultivator recited in claim 1, wherein said visual input means comprises a video camera.

3. The cultivator recited in claim 1, wherein said digitizing means comprises a frame grabber.

4. The cultivator recited in claim 1, wherein said means responsive to said means for determining a centerline comprises:

an asynchronous receiver and transmitter;

an actuator for actuating a displacement device attached to said tool;

a locating means for determining the position of said tool; and a central processing unit for receiving position information from said locating means and for actuating said actuator to move said tool to said centerline.

5. The cultivator recited in claim 4, wherein said locating means comprises a linear potentiometer.

6. The cultivator recited in claim 4, further comprising a manual adjusting means.

7. The cultivator recited in claim 6, wherein said manual adjusting means comprises at least one joystick.

8. The cultivator recited in claim 2, wherein said camera is mounted so as to have a centerline of said camera directly above a centerline of a pair of said tools.

9. The cultivator recited in claim 2, wherein said camera is orientated so that a long aspect ratio of said camera is parallel to said plant row.

10. The cultivator recited in claim 1, further comprising at least one band spray nozzle, said nozzle being rotatable about a vertical axis thus allowing a spray from said nozzle to be adjusted with respect to the direction of travel of said cultivator.

11. A method of controlling a robotic cultivator, having tools thereon, based upon visual information of plants in a plant row, said method comprising the steps of:

generating a visual image of plants and weeds in said plant row, said visual image being represented by pixels;

digitizing said pixels based upon visual characteristics of said plants and weeds;

generating mean and covariance values based upon said visual characteristics;

generating a probability table from said mean and covariance values;

comparing each of said pixels with said probability table to determine whether each of said pixels represents a plant;

generating a representative image from said digitized image where a logic state of one is assigned to each pixel representing a plant; and determining a centerline of only said plants based upon said representative image.

12. The method recited in claim 11, wherein said step of generating a probability table comprises the steps of:

using Bayes Law to compute the probability that a particular color will be in a plant; and assigning the value of a logical one to all probabilities where a particular color will be in said plant.

13. The method recited in claim 11, wherein said step of determining a centerline comprises the steps of:

scanning each pixel in said representative image, one row at a time, to determine if the value of that particular pixel is non zero;

incrementing one of a plurality of counters, said particular incremented counter associated with said pixel, if said pixel has a non zero value;

calculating a histogram from said plurality of counters;

calculating a mean of said histogram; and assigning said centerline to the location corresponding to a mean of said histogram.

14. The method recited in claim 13, further comprising the steps of:

dividing said plurality of counters into subsets;

calculating a histogram of each subset;

calculating a median for each histogram;

disregarding any median which significantly differs from an average of said medians of each histogram; and assigning said centerline location based upon the remaining medians and their corresponding physical locations.

15. The method recited in claim 11, wherein said step of determining a centerline comprises the steps of:

dividing said representative image into a plurality of regions with associated counters;

scanning each pixel in said representative image to determine if the value of that particular pixel is non zero;

determining which region each pixel having a non zero value is located and incrementing said associated counter;

repeating said scanning and determining steps until each pixel has been scanned;

comparing each counter to determine which counter has the maximum value; and assigning the location corresponding to the counter with the maximum value to said centerline.

16. The method recited in claim 11, further comprising the steps of:

determining a position of said tools;

comparing said tool position to a position relative to said centerline to generate an position error signal; and moving said tools to reduce said error signal;

repeating said determining and comparing steps until said error signal is within a predetermined tolerance.

* * * * *